(12) United States Patent
Falb

(10) Patent No.: US 9,421,903 B2
(45) Date of Patent: Aug. 23, 2016

(54) CONTROLLING EXTERIOR VEHICLE LIGHTS

(71) Applicant: Gentex Corporation, Zeeland, MI (US)

(72) Inventor: David M. Falb, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 14/577,099

(22) Filed: Dec. 19, 2014

(65) Prior Publication Data

US 2015/0175055 A1    Jun. 25, 2015

Related U.S. Application Data

(60) Provisional application No. 61/918,985, filed on Dec. 20, 2013.

(51) Int. Cl.
*B60R 22/00* (2006.01)
*B60Q 1/115* (2006.01)

(52) U.S. Cl.
CPC .......... *B60Q 1/115* (2013.01); *B60Q 2300/112* (2013.01); *B60Q 2300/114* (2013.01); *B60Q 2300/132* (2013.01)

(58) Field of Classification Search
None
See application file for complete search history.

(56) References Cited

U.S. PATENT DOCUMENTS

| 3,939,339 | A | 2/1976 | Alphen |
|---|---|---|---|
| 6,049,171 | A | 4/2000 | Stam et al. |
| 6,109,759 | A | 8/2000 | Tanabe et al. |
| 6,357,898 | B1 | 3/2002 | Toda et al. |
| 6,593,698 | B2 | 7/2003 | Stam et al. |
| 6,714,851 | B2 | 3/2004 | Hrovat et al. |
| 6,861,809 | B2 | 3/2005 | Stam |
| 8,325,986 | B2 | 12/2012 | Schofield et al. |
| 2001/0039469 | A1 | 11/2001 | Nishimura |
| 2006/0023461 | A1 | 2/2006 | Knight |
| 2010/0165102 | A1 | 7/2010 | Klebanov et al. |
| 2010/0309674 | A1 | 12/2010 | Su et al. |
| 2012/0158254 | A1* | 6/2012 | Takagaki ................. 701/49 |
| 2013/0258688 | A1* | 10/2013 | Kalapodas ............... 362/465 |
| 2014/0301094 | A1 | 10/2014 | Ehlgen et al. |

FOREIGN PATENT DOCUMENTS

| EP | 1 504 956 B1 | 5/2012 |
|---|---|---|
| RU | 2314216 C2 | 1/2008 |
| WO | WO 2010009928 | 1/2010 |

OTHER PUBLICATIONS

PCT Int'l App. No. PCT/US2014/071504 filed Dec. 19, 2014, Apr. 16, 2015—International Search Report and Written Opinion.
Eure!TechFlash: Smart Lighting, www.eurecar.org, May 2013, Edition 02.

(Continued)

*Primary Examiner* — Adam Alharbi
(74) *Attorney, Agent, or Firm* — Reising Ethington PC; Scott P. Ryan

(57) ABSTRACT

A system for adjusting a position of one or more exterior vehicle lights includes an accelerometer providing data indicating changes in vehicle pitch; a vehicle-mounted camera providing additional data indicating changes in vehicle pitch; and a control unit receiving the data from both the accelerometer and the vehicle-mounted camera, processing the data, and communicating a command to a vehicle light leveling actuator based on data from the accelerometer and the vehicle-mounted camera.

19 Claims, 1 Drawing Sheet

(56) References Cited

OTHER PUBLICATIONS

Andrew Glascott-Jones, Questex Media Group LLC, MEMS for Tilt Measurement and Headlight Leveling, Oct. 1, 2008.

Opfermann et al, A new hardware-in-the-loop platform for the evaluation of adaptive lighting systems, The International Federation of Automatic Control, Seoul, Korea, Jul. 2008.

* cited by examiner

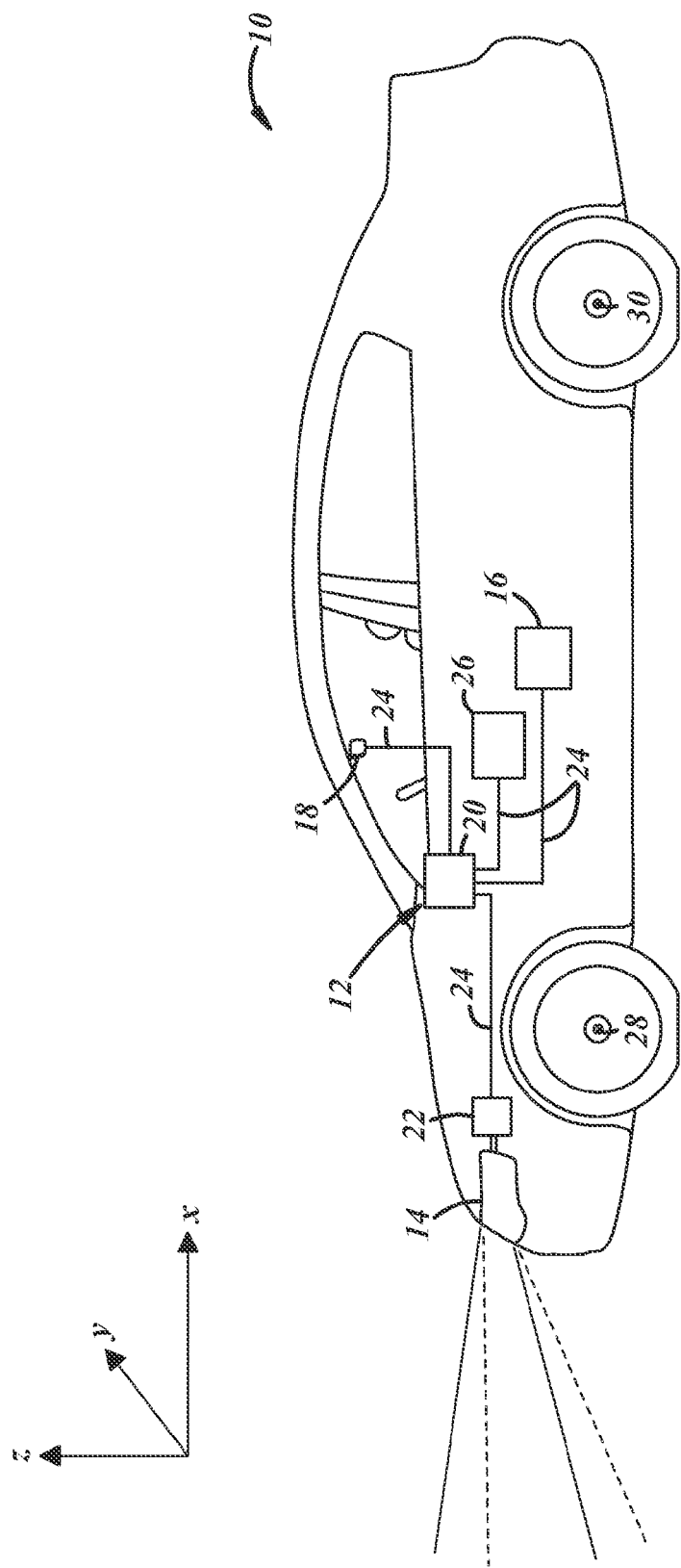

CONTROLLING EXTERIOR VEHICLE LIGHTS

This application claims the benefit of U.S. Provisional Application No. 61/918,985, filed on Dec. 20, 2013, the contents of which are hereby incorporated by reference in their entirety.

TECHNICAL FIELD

The present invention relates to vehicles and, more particularly, to controlling or adjusting exterior vehicle lights.

BACKGROUND

Vehicles have long used exterior lights for illuminating the road ahead to aid visibility for a driver. The performance of the exterior lights—often called headlights—can depend on where the lights are aimed. For instance, the exterior lights are usually used in the presence of other vehicles and are typically positioned so that a large portion of the generated light is directed toward an area on the road in front of the vehicle. The exterior lights have been positioned in this way by mechanically fixing the exterior lights and aim of the light generated when the vehicle is stationary and on a level surface. While the direction of the exterior vehicle lights may be ideal at the time the position is mechanically fixed (i.e., when the vehicle is level and possibly unloaded), that direction may not be ideal later when the vehicle is used or in motion. For example, acceleration, different fuel loads, a changing number of occupants, and even the undulations of the road can affect the direction of light generated by the exterior vehicle lights. The increase of vehicle weight and/or fuel may be applied aft of the vehicle's front wheels changing the direction of light such that it is no longer directed toward the road but instead higher; possibly irritating oncoming traffic. As a result, it can be helpful to adjust the position of the exterior lights based on changes in vehicle load or chassis position relative to the axles.

SUMMARY

According to one or more embodiments, a system is shown for adjusting a position of one or more exterior vehicle lights. The system includes an accelerometer providing data indicating changes in vehicle pitch; a vehicle-mounted camera providing additional data indicating changes in vehicle pitch; and a control unit receiving the data from both the accelerometer and the vehicle-mounted camera, processing the data, and communicating a command to a vehicle light leveling actuator based on data from the accelerometer and the vehicle-mounted camera.

According to one or more embodiments, a system is shown for adjusting a position of one or more exterior vehicle lights. The system includes an accelerometer providing data indicating changes in vehicle pitch; a vehicle-mounted camera providing additional data indicating changes in vehicle pitch; and a control unit that receives the data from both the accelerometer and the vehicle-mounted camera, processes the data, communicates a first command to a first vehicle light leveling actuator based on data from the accelerometer and the vehicle-mounted camera, and communicates a second command to a second vehicle light leveling actuator based on data from the accelerometer and the vehicle-mounted camera.

BRIEF DESCRIPTION OF THE DRAWINGS

One or more embodiments of the disclosure will hereinafter be described in conjunction with the appended drawing, wherein like designations denote like elements, and wherein FIG. 1 is a block diagram depicting an embodiment of an exterior vehicle light adjustment system.

DETAILED DESCRIPTION OF THE ILLUSTRATED EMBODIMENTS

The system described below controls the position of exterior vehicle lights based on data obtained from both an accelerometer and a vehicle-mounted camera. The system can detect changes in vehicle pitch using data from the accelerometer and the vehicle-mounted camera and then adjust or control the position of the exterior vehicle lights to compensate for the changes in vehicle pitch. The vehicle pitch changes can be described as movement of the vehicle chassis or body carrying vehicle lights relative to the vehicle axles such that the movement changes the location or focus of a beam of light generated by one or more exterior vehicle lights. The vehicle-mounted camera can provide data that is used to determine changes in vehicle pitch relative to a horizon or ego motion detected by the camera. However, when the vehicle is located in an area where the vehicle-mounted camera has difficulty generating an image, such as in a dark garage or when vehicle speed is slow (e.g., less than 5 miles per hour (MPH)), the vehicle-mounted camera may have difficultly providing accurate data for determining vehicle pitch. The data from the accelerometer can be used to determine vehicle pitch when the vehicle is parked or moving at a relatively slow speed when the data provided by the camera is less accurate.

The system can use both the vehicle-mounted camera and the accelerometer to maximize accuracy of vehicle pitch measurements over a wide variety of environments. While the vehicle-mounted camera and the accelerometer can each provide data for determining vehicle pitch and/or changes in vehicle pitch, such as when a vehicle accelerates/decelerates or experiences road undulations, some causes of the vehicle pitch are better detected by a system that uses the in-vehicle camera or the accelerometer. For example, the vehicle-mounted camera can provide more accurate data than the accelerometer when vehicle pitch changes slowly over a period of time. This can occur when vehicle pitch changes are caused by vehicle fuel consumption as the vehicle operates thereby making the vehicle lighter at one of the vehicle axles or by the accumulation of wear on vehicle suspension components. Both of these conditions can change the pitch of the vehicle. In contrast, the accelerometer may provide more accurate data when the vehicle is at rest or travelling slowly. For instance, when vehicle pitch changes are caused by passengers entering or exiting the vehicle, trailers hitched or unhitched to the vehicle, cargo loading or unloading, or vehicle fueling, the accelerometer can provide more accurate data for vehicle pitch changes than the vehicle-mounted camera. The system described herein can identify the cause of vehicle pitch change (e.g., cargo loading v. fuel consumption) and select data from the vehicle-mounted camera, the accelerometer, or both depending on the identified cause.

With reference to FIG. 1, there is shown a mobile vehicle 10 or vehicle chassis that includes a system 12 of controlling the position of exterior vehicle lights 14. The exterior vehicle lights 14 can include vehicle headlights that create light using a variety of mechanisms or technologies, such as xenon, halogen, light-emitting diode (LED), or laser. However, it should be appreciated that exterior vehicle lights 14 can also include other types of lights such as fog lights or driving lights. The system 12 includes an accelerometer 16, a vehicle-mounted camera 18, a control unit 20, and a vehicle light leveling actuator 22 for controlling the position or angle of one or more exterior vehicle lights 14. The accelerometer 16, the vehicle-mounted camera 18, the control unit 20, and the vehicle light leveling actuator 22 can be communicatively connected within the vehicle 10 using a vehicle bus 24 over which data can be sent. In some implementations, the system 12 can include a speed sensor 26 that can detect vehicle speed and output data indicating the detected speed over the vehicle bus 24. In some implementations, the accelerometer 16 can be included with the vehicle-mounted camera 18 in a single component or unit.

The accelerometer 16 can detect changes in vehicle motion or vehicle pitch and translate those detected changes into data that it outputs. For instance, when the position of the vehicle chassis changes, the accelerometer 16 can detect the magnitude or amount of the change and output it as data. The detected change can be described as a change in vehicle pitch and can be measured relative to a previously-detected vehicle pitch measurement or can be measured relative to an absolute value. That is, the accelerometer 16 can detect that the vehicle 10 is motionless and then determine that the pitch of the vehicle 10 has changed. In that case, the accelerometer 16 can determine the magnitude of vehicle pitch change that has occurred relative to the value measured when the vehicle 10 was at rest. The system 12 can measure vehicle pitch in degrees or any other known angle measurement. It is also possible for the accelerometer 16 to compare vehicle motion to an absolute value (e.g., 0 degrees) and detect changes in vehicle pitch or vehicle speed/acceleration relative to the absolute value.

Changes in vehicle pitch can be positive in the z-axis direction, which could then cause the beam of light generated by the exterior vehicle lights 14 to adjust to an area of the road further ahead of the vehicle 12. Conversely, when changes in vehicle pitch are negative, the beam of light generated by the exterior vehicle lights can begin to focus on an area of the road nearer to the vehicle 12.

Regardless of how the vehicle pitch changes are measured, the accelerometer 16 can detect the changes when the vehicle 10 is parked or rapidly accelerating/decelerating. Both of these conditions can be determined using data obtained from the speed sensor 26. For instance, the control unit 20 can receive the data from the speed sensor 26 and detect that the speed is zero or below a threshold, such as 5 MPH. Similarly, the control unit 20 can receive data from the speed sensor 26 and determine that the rate of change of vehicle velocity exceeds a predetermined threshold thereby indicating that the vehicle 12 is accelerating/decelerating rapidly. The data output from the accelerometer 16 can be sent to the control unit 20 over the vehicle bus 24 and analyzed in response to control unit 20 determining that speed and/or acceleration thresholds have been met. In one implementation, the accelerometer 16 can be a two-axis accelerometer mounted on a printed circuit board (PCB). One possible accelerometer 16 that can be used with the system 12 is produced by MEMSIC and known by model number MXC6235xQB. Other accelerometers measuring movement in one or more axes are possible. And the vehicle bus 24 can be implemented using a variety of suitable network connections, such as a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle-mounted camera 18 can continuously create an image of the environment surrounding the vehicle 10 and measure changes in vehicle movement or vehicle pitch based on changes in or movement of one or more objects within the created image. For instance, the vehicle-mounted camera 18 can create an image of a road in front of the vehicle 10 that includes lane lines of the road and other non-vertical edges of objects as well as a horizon or "sky-edge." The vehicle-mounted camera 18 can then detect changes in vehicle movement or vehicle pitch based on one or more changes in the created image. These changes can include detecting up or down movement (e.g., in the z-axis) of the horizon or sky-edge. In this case, the vehicle-mounted camera 18 can detect additional light points along the horizon where none had previously existed. Based on that detection, it can be determined that the horizon has moved. Or the slope of the lane lines of the road or other non-vertical edges in the created image can change over time. When the slope of these lines or edges change, it can indicate that the pitch of the vehicle 10 has changed as well. In one implementation, the vehicle-mounted camera 18 can be triggered to continuously create an image of the environment surrounding the vehicle 10. It is also possible to use the vehicle-mounted camera 18 to create an image of the environment based on a rapid increase or decrease in velocity as detected at the control unit 20 using data obtained from the speed sensor 26. In another implementation, the vehicle-mounted camera 18 can be included with a rearview mirror assembly and fixed adjacent to a windshield inside the vehicle 10. The vehicle-mounted camera 18 can use a complementary metal-oxide semiconductor (CMOS) imaging sensor to generate the images discussed above.

The control unit 20 can receive data from the accelerometer 16, the vehicle-mounted camera 18, and the speed sensor 26 over the vehicle bus 24 and based on that data transmit commands to the vehicle light leveling actuator 22 to control the position of one or more exterior vehicle lights 14. The control unit 20 can be implemented as a type of device capable of processing electronic instructions including microprocessors, microcontrollers, host processors, controllers, vehicle communication processors, and application specific integrated circuits (ASICs). It can be a dedicated processor used only for the system 12 or it can be shared with other vehicle systems. The control unit 20 can execute various types of digitally-stored instructions, such as software or firmware programs stored in memory located at the vehicle 12.

The vehicle light leveling actuator 22 is an electromechanical device that can include a physical mechanism for moving or adjusting one or more exterior vehicle lights 14 about one or more axes and an electrical component for receiving instructions from the control unit 20 that direct the physical mechanism. After receiving data from the accelerometer 16 and the vehicle-mounted camera 18, the control unit 20 can calculate whether the change in vehicle pitch is positive or negative relative to the z-axis. As noted above, when the pitch change is positive, the focus of the beam generated by the exterior vehicle lights 14 moves to a point on the road further away from the vehicle 12, parallel to the road, or higher. When this change is detected, the control unit 20 can direct the vehicle light leveling actuator 22 to adjust the position of the exterior vehicle lights 14 so that the focus of the beam does not change with the change in vehicle pitch—in this case adjusting the focus of the beam downward. This downward movement of the exterior vehicle lights 14 is shown affecting the beam of light using phantom lines in FIG. 1. In contrast, when the pitch change is negative, the focus of the beam generated by the exterior vehicle lights 14 moves to a point on the road closer to the vehicle 12. When this change is detected, the control unit 20 can direct the vehicle light leveling actuator 22 to adjust the position of the exterior vehicle lights 14 so that the focus of the beam does not change—in this case adjusting the focus of the beam upward.

It should be appreciated that the system 12 can also detect vehicle roll or side-to-side pitch about the x-axis shown in FIG. 1. In that sense, when a plurality of exterior vehicle lights 14 are being controlled, one light can be controlled independently from another. In one example, if the vehicle 10 rotates or rolls about the x-axis, one of the exterior vehicle lights 14 could be moved upwards whereas another exterior vehicle light 14 could be moved downwards. The vehicle light leveling actuator 22 can compensate for the upward movement of one of the exterior lights 14 by angling that light downward. Another vehicle light leveling actuator 22 can compensate for the downward movement of the other exterior vehicle light 14 by angling it upward. Such a condition could occur when the vehicle 10 is loaded with more weight on the passenger side relative to the driver side of the vehicle 10 or when the vehicle 10 rolls during cornering.

While a variety of physical mechanisms for adjusting the position of exterior vehicle lights 14 are possible, one implementation can include an electric motor with a rotary output shaft the movement of which can cause the exterior vehicle light or lights to pivot about an axis. This axis can be approximately perpendicular to the direction of vehicle travel and parallel to the y-axis shown in FIG. 1. The rotary output shaft can be ultimately attached to the exterior vehicle light(s) 14 using a linkage comprising a first link and a second link that are connected via a coupling. The rotary output shaft of the vehicle light leveling actuator 22 can control the exterior vehicle light(s) 14 using the linkage. A distal end of the first link can fixedly attach to the rotary output shaft and a distal end of the second link can fixedly attach to an exterior vehicle light 14 with the coupling of the linkage located in-between the two attachment points. When the change in vehicle pitch is positive, the vehicle light leveling actuator 22 can be directed to adjust or pivot the exterior vehicle lights downward by rotating the rotary output shaft in one direction. And when the vehicle pitch is negative, the vehicle light leveling actuator 22 can be directed to adjust or pivot the exterior vehicle lights upward by rotating the rotary output shaft in an opposite direction.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A system for adjusting a position of one or more exterior vehicle lights, comprising:
   an accelerometer operable to indicate a change in a vehicle chassis pitch relative to one or more axles of a vehicle while the vehicle is parked or moving less than 5 miles per hour (MPH);
   a vehicle-mounted camera operable to generate a plurality of images and indicate a change in vehicle chassis pitch relative to one or more axles of the vehicle based on a change in an object within the plurality of images; and
   a control unit operable to receive indications from the accelerometer and the vehicle-mounted camera and, based on the indications, communicate a command to a vehicle light leveling actuator.

2. The system of claim 1, further comprising a speed sensor providing speed data to the control unit.

3. The system of claim 2, wherein the control unit selects, based on the speed data, the indication of the change in vehicle chassis pitch provided by the accelerometer over the indication of the change in vehicle chassis pitch provided by the vehicle-mounted camera.

4. The system of claim 1, wherein the accelerometer comprises a two-axis accelerometer.

5. The system of claim 1, wherein the vehicle-mounted camera is combined with a rearview mirror assembly and mounted adjacent a windshield in a vehicle.

6. The system of claim 1, wherein the vehicle-mounted camera includes a complementary metal-oxide semiconductor (CMOS) imaging sensor.

7. The system of claim 1, wherein the vehicle-mounted camera is operable to generate a plurality of images by generating a plurality of images including one or more road lines and is operable to indicate change in vehicle chassis pitch based on a change in at least one of a slope or position of the one or more road lines.

8. The system of claim 1, wherein the vehicle-mounted camera is operable to generate a plurality of images by generating a plurality of images including a horizon and is operable to indicate a change in vehicle chassis pitch based on a number of light points along the horizon.

9. The system of claim 1, further comprising a linkage that connects the vehicle light leveling actuator and an exterior vehicle light.

10. The system of claim 1, further comprising the vehicle light leveling actuator in communication with the controller, the vehicle light leveling actuator operable to position the one or more exterior vehicle lights.

11. A system for adjusting a position of one or more exterior vehicle lights, comprising:
    an accelerometer operable to indicate a change in a vehicle chassis pitch relative to one or more axles of a vehicle while the vehicle is parked or moving less than 5 miles per hour (MPH);
    a vehicle-mounted camera operable to generate a plurality of images and indicate a change in vehicle chassis pitch relative to one or more axles of the vehicle based on a change in an object within the plurality of images; and
    a control unit operable to receive the indications from the accelerometer and the vehicle-mounted camera and, based on the indications, communicate a first command to a first vehicle light leveling actuator and a second command to a second vehicle light leveling actuator.

12. The system of claim 11, further comprising a speed sensor providing speed data to the control unit.

13. The system of claim 12, wherein the control unit selects, based on the speed data, the indication of the change in vehicle chassis pitch provided by the accelerometer over the indication of the change in vehicle chassis pitch provided by the vehicle-mounted camera.

14. The system of claim 11, wherein the vehicle-mounted camera is combined with a rearview mirror assembly and mounted adjacent a windshield in a vehicle.

15. The system of claim 11, wherein the vehicle-mounted camera generates an image comprising one or more road lines and detects changes in vehicle chassis pitch based on a change in at least one of a slope or a position of the one or more road lines shown in the generated image.

16. The system of claim 11, wherein the vehicle-mounted camera is operable to generate a plurality of images by generating a plurality of images including a horizon and is operable to indicate a change in vehicle chassis pitch based on a number of light points along the horizon.

17. The system of claim 11, wherein the vehicle-mounted camera includes a complementary metal-oxide semiconductor (CMOS) imaging sensor.

18. The system of claim 11, further comprising the vehicle light leveling actuator in communication with the controller, the vehicle light leveling actuator operable to position one or more exterior vehicle lights.

19. The system of claim 11, wherein the first command and the second command include different adjustment values.

* * * * *